(12) United States Patent
Necaise (10) Patent No.: US 7,547,076 B2
(45) Date of Patent: Jun. 16, 2009

(54) WHEEL COVERING SYSTEM

(75) Inventor: Ronald Necaise, Kerrville, TX (US)

(73) Assignee: Prestige Autotech Corporation, Chino, CA (US)

( * ) Notice: Subject to any disclaimer, the term of this patent is extended or adjusted under 35 U.S.C. 154(b) by 0 days.

(21) Appl. No.: 11/626,554

(22) Filed: Jan. 24, 2007

(65) Prior Publication Data

US 2008/0174167 A1 Jul. 24, 2008

(51) Int. Cl.
*B60B 7/14* (2006.01)
*B60B 27/00* (2006.01)

(52) U.S. Cl. .............................. 301/37.371; 301/108.4

(58) Field of Classification Search ............ 301/37.101, 301/37.26, 37.102, 37.371, 37.106, 37.107, 301/37.108, 37.28, 37.38, 35.627, 35.629, 301/35.631, 108.1, 108.2, 108.4
See application file for complete search history.

(56) References Cited

U.S. PATENT DOCUMENTS

| | | | |
|---|---|---|---|
| 1,607,273 A * | 11/1926 | Hecht | ............... 411/432 |
| 1,644,339 A | 10/1927 | Kalatzky | |
| 1,790,737 A | 2/1931 | Aiborn | |
| 1,979,895 A | 11/1934 | Maker | |
| 2,006,639 A | 7/1935 | Horn | |
| 2,031,092 A | 2/1936 | Begg | |
| 2,169,237 A | 8/1939 | Gasco | |
| 2,249,568 A | 7/1941 | Shinliver | |
| 2,548,070 A | 4/1951 | Ryan | |
| 2,722,822 A | 11/1955 | Thomas | |
| 2,869,262 A | 1/1959 | Lucas | |
| 2,935,361 A | 5/1960 | Aske | |
| 3,005,906 A | 10/1961 | Butler, Jr. | |
| 3,317,247 A | 5/1967 | Lamme | |
| 3,367,722 A * | 2/1968 | Miyanaga | ............... 301/108.1 |
| 3,457,663 A | 7/1969 | Beaudoin et al. | |
| 3,653,719 A | 4/1972 | Osawa et al. | |
| 3,795,997 A | 3/1974 | Walton et al. | |
| 3,833,266 A | 9/1974 | Lamme | |
| 3,893,690 A * | 7/1975 | Yapp | ............... 301/108.3 |
| 3,967,855 A | 7/1976 | Johnson | |
| 4,217,002 A * | 8/1980 | Simpson | ............... 301/37.26 |
| 4,274,679 A | 6/1981 | Brinson et al. | |
| 4,280,293 A | 7/1981 | Kovalenko et al. | |
| 4,346,940 A | 8/1982 | Tatar | |
| 4,447,091 A * | 5/1984 | Nguyen et al. | ............... 301/37.21 |
| 4,452,493 A | 6/1984 | Liggett | |
| 4,478,458 A | 10/1984 | Flexman | |
| 4,606,582 A | 8/1986 | Warren | |
| 4,761,040 A | 8/1988 | Johnson | |
| 4,787,681 A | 11/1988 | Wang et al. | |
| 4,881,783 A | 11/1989 | Campbell | |
| 4,932,724 A | 6/1990 | Wright | |
| 4,946,228 A | 8/1990 | Hsu et al. | |

(Continued)

*Primary Examiner*—Jason R Bellinger
*Assistant Examiner*—Kip T Kotter
(74) *Attorney, Agent, or Firm*—Fulwider Patton LLP (57) ABSTRACT

A wheel covering system is disclosed having a first external cover element and a second internal cover element screwed to the first element. The wheel covering system is connected to an hub of a large vehicle such as a truck without relying on lugs provided on the hub for connecting the wheel to the hub. The connection is achieved by relying on bolts used to attach a hub cap (or axle cover) to the axle, without eliminating the hub cap (or axle cover), and at the same time providing a sturdy and robust connection capable of withstanding forces expected to be applied to a wheel cover during its lifetime.

30 Claims, 11 Drawing Sheets

U.S. PATENT DOCUMENTS

| | | |
|---|---|---|
| 4,961,611 A | 10/1990 | Patti |
| 4,971,396 A | 11/1990 | Morris |
| 4,974,909 A * | 12/1990 | Patti et al. ................. 301/37.31 |
| RE33,806 E | 1/1992 | Wang et al. |
| 5,150,949 A | 9/1992 | Wang |
| 5,152,584 A | 10/1992 | Maxwell, Jr. |
| 5,263,770 A * | 11/1993 | Goudey ................. 301/37.376 |
| 5,464,277 A | 11/1995 | Redd |
| 5,542,750 A | 8/1996 | Fitzgerald |
| 5,584,537 A | 12/1996 | Miansian |
| 5,588,715 A | 12/1996 | Harlen |
| 5,659,989 A | 8/1997 | Hsiao et al. |
| 5,676,430 A | 10/1997 | Wright et al. |
| 5,707,113 A | 1/1998 | Russell |
| 5,820,224 A | 10/1998 | Dimatteo, Jr. |
| 5,820,225 A * | 10/1998 | Ferriss et al. .......... 301/37.371 |
| 5,845,972 A | 12/1998 | Baker |
| 5,853,228 A | 12/1998 | Patti et al. |
| 5,876,099 A | 3/1999 | Irgens-Moller et al. |
| 5,890,773 A | 4/1999 | Wright et al. |
| 6,045,195 A | 4/2000 | Okamoto |
| 6,070,947 A | 6/2000 | Hoyle, Jr. |
| 6,089,671 A * | 7/2000 | Iacovelli et al. ........ 301/37.108 |
| 6,378,955 B1 | 4/2002 | Adamson et al. |
| 6,419,327 B1 | 7/2002 | Renshaw |
| 6,447,072 B1 * | 9/2002 | Johnson ................... 301/108.2 |
| 6,554,370 B2 | 4/2003 | Fowlkes |
| 6,637,833 B2 | 10/2003 | Hsu et al. |
| 6,655,061 B1 * | 12/2003 | Good ......................... 40/587 |
| 6,688,703 B1 * | 2/2004 | Wang ...................... 301/37.23 |
| 6,702,395 B1 | 3/2004 | Wang |
| 6,799,810 B1 | 10/2004 | Wang |
| RE38,779 E | 8/2005 | Lovitt, Jr. |
| 6,953,226 B2 | 10/2005 | Bruce et al. |
| 6,971,722 B2 | 12/2005 | Denton |
| 2006/0220443 A1 * | 10/2006 | Olson ..................... 301/108.1 |

* cited by examiner

WHEEL COVERING SYSTEM

BACKGROUND OF THE INVENTION

The present application relates to ornamental wheel covers, in particular to wheel cover assemblies that are suitable for affixing to vehicles such as heavy trucks, or rigs, and the like.

The motor vehicular transport industry today is a vibrant part of the economy, and many large transport trucks and rigs are privately owned. Indeed, many a large rig is the effective home of its private owner, providing onboard computers, communication systems, televised entertainment, and sleeping quarters. Ornamentation of the exterior has become an important aspect of personal ownership. Accordingly, the fitting of ornamental wheel covers over the wheels of large rigs and trucks has become widespread in recent years.

Unfortunately, the devices and methods used to attach ornamental cover assemblies over the wheels of large vehicles suffer from various shortcomings. Commonly, some devices for attaching ornamental covers over wheels have relied upon outwardly extending threaded lugs which are typically provided on the axle for attaching the wheel to the hub. Although this method uses structure present on the vehicle which is clearly intended for affixation of structure (such as a wheel), the method has the disadvantage of making the integrity of the wheel attachment structure dependent upon the viability of a foreign structure that was not part of the vehicle manufacturer's original wheel attachment design. The addition of foreign structure to the original wheel attachment assembly may lead to shortcomings, and indeed, may lead to denial of insurance coverage where the shortcomings are attributable to structure foreign to the original vehicle design. Additional problems may arise should the vehicle be subject to inspection by local, state, or federal authorities. Some inspectors may require that ornamental wheel covers be removed to present a clear view of the wheel attachment system. Removal of the covers may require the vehicle to be jacked up, on a wheel by wheel basis, to take the load off each wheel while the covers are being removed, causing considerable inconvenience.

One method for attaching wheel covers over wheels that has been used to avoid relying on structure dedicated to wheel attachment is to launch a cover attachment assembly from a hub's oil or grease hub cap attachment structure, rather than the wheel attachment structure. One such device that has been developed provides a number of threaded rods, each rod having a stop nut toward each end. A first stop nut is set at a desired position along the length of the rod, allowing the rod to be inserted, at one end, to a desired depth into a threaded hole in the hub that would otherwise receive one of the half dozen or so bolts for holding down a hub cap. (Three such threaded rods might be provided in triangulated formation, displacing three of the regular hub cap hold-down bolts.) At the other end of each rod, a second stop nut may be adjusted to permit an ornamental wheel cover to be set to the correct orientation in relation to the wheel. In this way, any loading applied to the ornamental wheel cover is transmitted via the rods back to the grease hub, and the wheel attachment structure is left unaffected by any impact or load upon the ornamental wheel cover.

However, a shortcoming in the foregoing structure is that it is flimsy, in that an impact on the ornamental wheel cover may permanently bend or buckle the rods out of original alignment, leaving the wheel cover in a disfigured spatial relationship to the wheel, defeating the purpose of the ornamentation.

Another shortcoming found in the prior art relates to the bolts or studs used to affix the wheel cover over the wheel. Typically, an ornamental wheel cover sized to fit a large truck, and configured to survive the kind of occasional impact load that can be expected in this context, may be made of cast aluminum, and may weigh about 15 to 30 pounds. It has been found that a wheel cover having such a large weight may suffer from inadequate torsional and shear attachment to the wheel hub where insufficient attachment means are provided. Where a single central stud is provided for attachment, the rotational momentum of a heavy wheel cover may cause the cover to incline to rotate independently when the vehicle is brought to a sudden stop, because the wheel cover does not have its own braking system and may not be connected over the wheel other than at a central stud. Added to the problem of rotational momentum may be the problem of shear, which may be additionally incurred when the cover is impacted by collision with a curb, bollard or the like.

Accordingly, there is a need for an improved structure and method of affixing ornamental wheel covers over wheels of vehicles such as trucks. The present invention addresses these and other needs.

SUMMARY OF THE INVENTION

According to a preferred embodiment of the invention, there is described a wheel covering system that provides a sturdy and robust system for attaching an ornamental wheel cover over a wheel of a large vehicle such as a truck or rig, coverable of withstanding the kind of impact load that a wheel cover might experience over its lifetime, yet being easy to attach, and avoiding connection with the wheel attachment system of the axle hub.

In a preferred embodiment, the wheel covering system is configured for attachment to a vehicle hub in which the hub has a plurality of threaded lugs for attaching a wheel, and on which a hub cap is attached to the hub by a plurality of threaded bolts. The system includes an ornamental cover having a center point and is configured to be positioned adjacent the wheel, the cover having two holes, each hole offset an equal distance from the center point. A mounting member is provided for connecting the cover over the wheel. The mounting member is configured to be removably attached to two diametrically opposite sides of the hub cap without being in contact with the threaded lugs. The mounting member has a distal end and a proximal end, in which the distal end defines a plurality of holes configured to receive at least some of the threaded bolts that hold down the hub cap. (The terms "distal" and "proximal" as referred to herein are from the perspective of one installing the covering system, thus meaning inward and outward of the vehicle respectively.) These holes are for permitting both the mounting member and the hub cap to be attached to the hub, the mounting member spanning across the outside of the hub cap. The proximal end of the mounting member includes two outwardly extending threaded studs for insertion into the two holes of the ornamental cover, to permit removable attachment of the cover to the mounting member. Thus, the invention avoids any connection to the threaded lugs which are used for attaching the wheel to the hub.

In a further aspect, the wheel covering system includes a feature in which the ornamental cover has a third hole at the center point, and the proximal end of the mounting member includes a spindle positioned to be inserted through the third hole. Preferably, the spindle may be longer than the flanking studs. Thus, the spindle advantageously facilitates attachment of the cover over the wheel because, when the mounting member has been attached to the hub, it permits the operator to slip the cover over the spindle first, then, by rotating the cover somewhat, to match the two offset holes in the cover with the studs and push the cover over the spindle and studs. The central hole may have a conical portion to facilitate this action. The studs and spindle provide a high degree of redundancy to secure the connection and provide a factor of safety against rotational and shear forces that may be exerted during braking or in a collision.

In other aspects of the covering system, the ornamental cover has a recess for housing the studs. A bolt-on cap closes off the recess, providing a smooth outer surface to the cover when completely mounted. Preferably, the recess has a floor that is flat, and the proximal end of the mounting member is flat. Thus, the floor of the recess is configured to be compressed against the proximal end of the mounting member by nuts screwed onto the threaded studs, and this provides a secure and wobble free attachment of the cover to the mounting member.

In one embodiment of the invention, principally for steering and trailing axles, the mounting member includes a cylindrical portion, an external flange attached to the distal end of the mounting member, and a circular plate attached to the proximal end of the mounting member. Preferably, the cylindrical portion is between 3 and 4 mm thick, to provide a sufficiently light but robust mounting member for connecting the cover to hub. A plurality of holes are formed in the flange to receive the hub cap bolts, whereby both the mounting member and the hub cap may be attached to the hub, the mounting member covering the hub cap. The threaded studs are attached to the circular plate at the proximal end of the mounting member. Preferably, the mounting member includes a slot configured to receive a valve of the hub cap. In this way, the oil or grease level may be maintained without removing the mounting member from the hub. Additionally, the mounting member may include an orifice positioned to allow inspection, through the mounting member, of the oil or grease level in the hub cap. Thus, the oil or grease level may be checked without removing the mounting member from the hub.

In a second embodiment, principally for drive axles, the mounting member is configured to provide attachment of an ornamental cover to a hub having an axle mounting cap. The mounting member of this embodiment also does not contact threaded lugs on the hub that are intended for attaching a wheel to the axle. However, here, the mounting member is formed from an initially flat plate having two ends. The plate is bent to a configuration adapted to span across the axle mounting cap and to be fixed to the axle mounting cap at the two ends. In this embodiment, the thickness of the plate is preferably between 4 mm and 5 mm to provide desirable stiffness and strength. This configuration also overcomes shortcomings in the prior art, and provides a sufficiently robust configuration for a wheel covering system that can be expected to experience impact loads during its lifetime.

These and other advantages of the invention will become more apparent from the following detailed description thereof and the accompanying exemplary drawings.

DETAILED DESCRIPTION OF THE PREFERRED EMBODIMENTS

With reference to the drawings which are by way of example and not limitation, a wheel cover assembly and attachment system is disclosed having features of the wheel covering system of the present invention. In setting forth the features of the present invention, there will first be described a cover assembly of a preferred embodiment that is structured for incorporation with the wheel covering system of the present invention. Second, there will be described one kind of heavy truck hub structure that a wheel cover assembly will commonly encounter for attachment. Third, there will be described one preferred embodiment of an attachment system structured for incorporation with the wheel covering assembly of the present invention in the context of the described truck hub. Fourth, there will be described a further type of heavy truck hub structure that a wheel cover assembly may commonly encounter for attachment. Fifth, there will be described variations to the embodiments of the wheel cover assembly and attachment systems earlier described.

Figure 5:
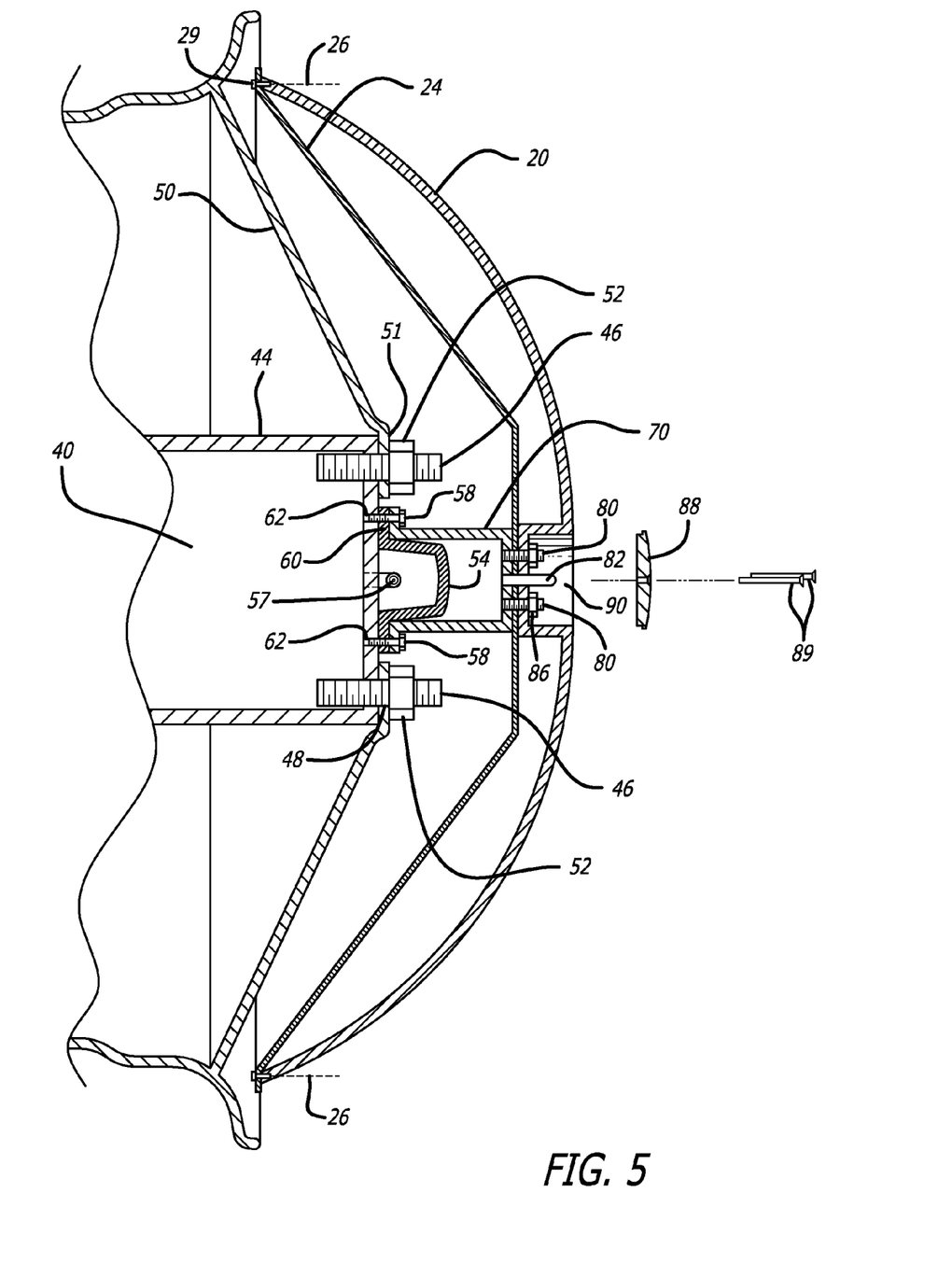
FIG. 5 is a vertical sectional view of the wheel in FIG. 4, including a wheel covering system having features of the present invention.

Turning now to a first embodiment of a wheel cover assembly of the present invention, as best seen in FIG. 5, an ornamental outer cover adapted for attachment according to the present invention is generally indicated by the numeral 20. Where the cover 20 is intended for attachment to a large vehicle such as a truck or rig, it is beneficially made of cast aluminum, and may weigh as much as about 15 to 30 pounds. This substantial weight gives the cover 20 considerable durability, able to withstand the occasional impact that is inevitable over the lifetime of a cover.

In a preferred embodiment, the cover 20 has openings (not shown in the figures) that give the cover a visible depth to one viewing the cover attached to a wheel. To enhance this visible depth, a second cover element is provided, being a foil sheet 24 specially made to have enhanced reflective properties on one side, preferably out of aluminum or stainless steel and in the range of 0.5 to 1 mm thick. The foil sheet 24 is placed distal to the outer cover 20 with the reflective side facing the exterior. In this way, one viewing the cover 20 looks through the openings in the cover 20 onto the reflective foil sheet 24 with the effect that the foil obstructs the view onto the unattractive structural details of the wheel attachment system, and reflects light to give an overall attractive ornamental appearance. The combination of cover 20 and foil 24 is referred to as a cover assembly, in this and in further embodiments.

Figure 5A:
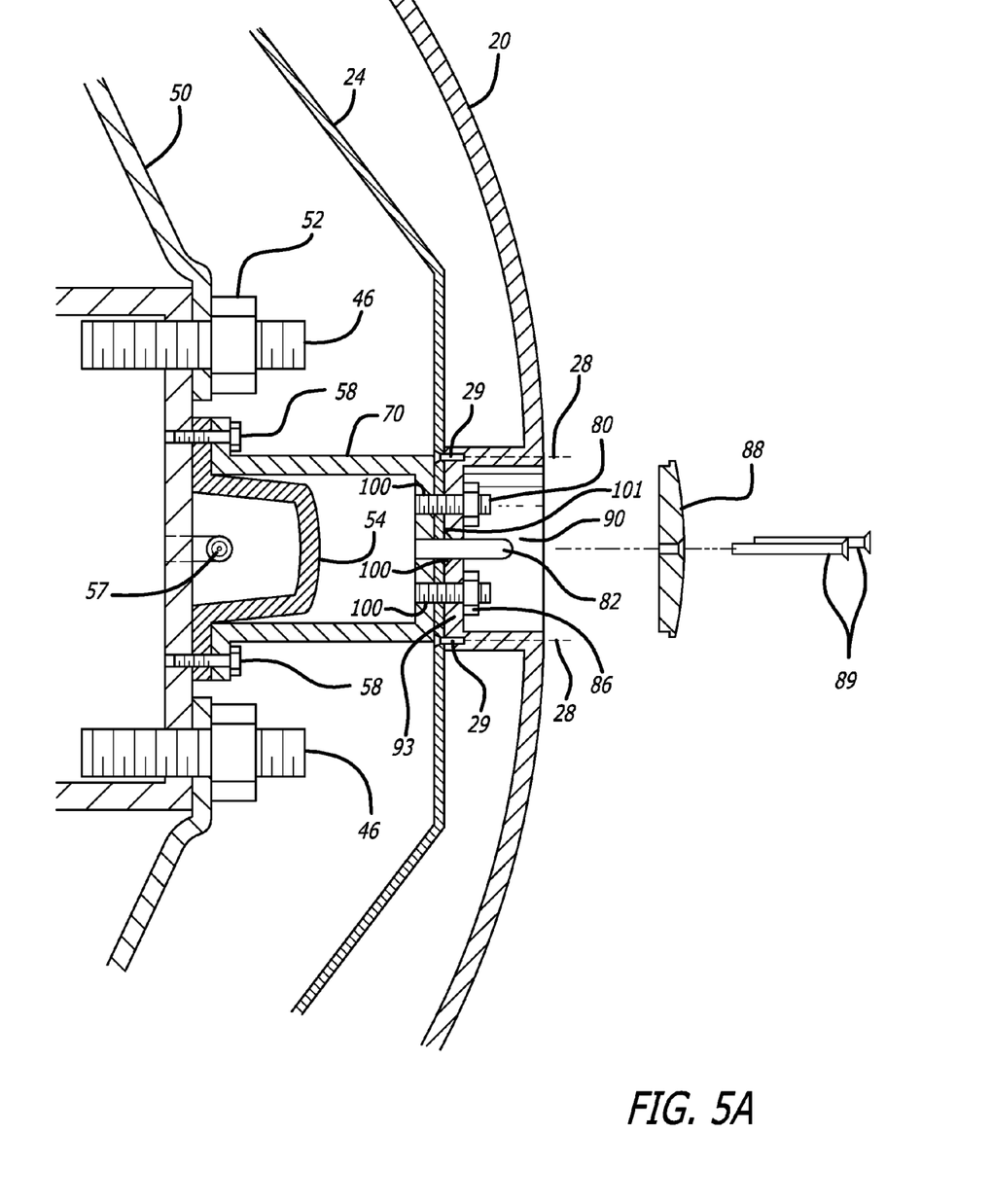
FIG. 5A is an expanded view of the central portion of FIG. 5.
Figure 6:
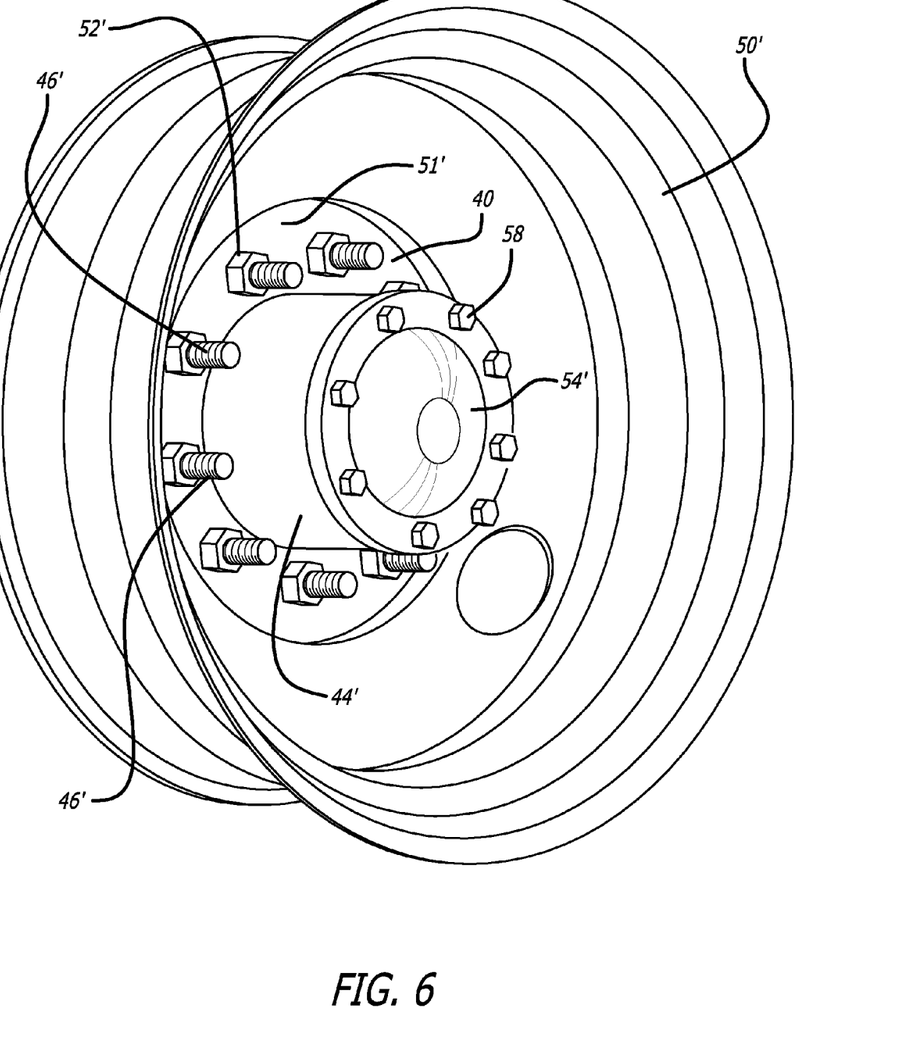
FIG. 6 is a perspective view of a typical drive wheel attached to a different kind of hub of a truck.

In a preferred embodiment, an outer circumferential rim of the inner foil 24 may be configured to contact the ornamental cover 20 along an outer circumferential line 26 (FIG. 5), and also along an inner circumferential line 28 (seen in FIG. 5A). Matching holes may be drilled into the foil 24 and cover 20 along both the inner and outer lines of contact 26, 28 at points spaced apart, so that tapping screws 29 may be inserted through the foil 24 and screwed into the cover 20, to fixedly attach the foil 24 to the cover 20 along two circumferential lines. This attachment of foil to cover has the advantage of making the wheel assembly easy to manipulate as a single object, facilitating installation, removal, storage, and transport.

Figure 1:
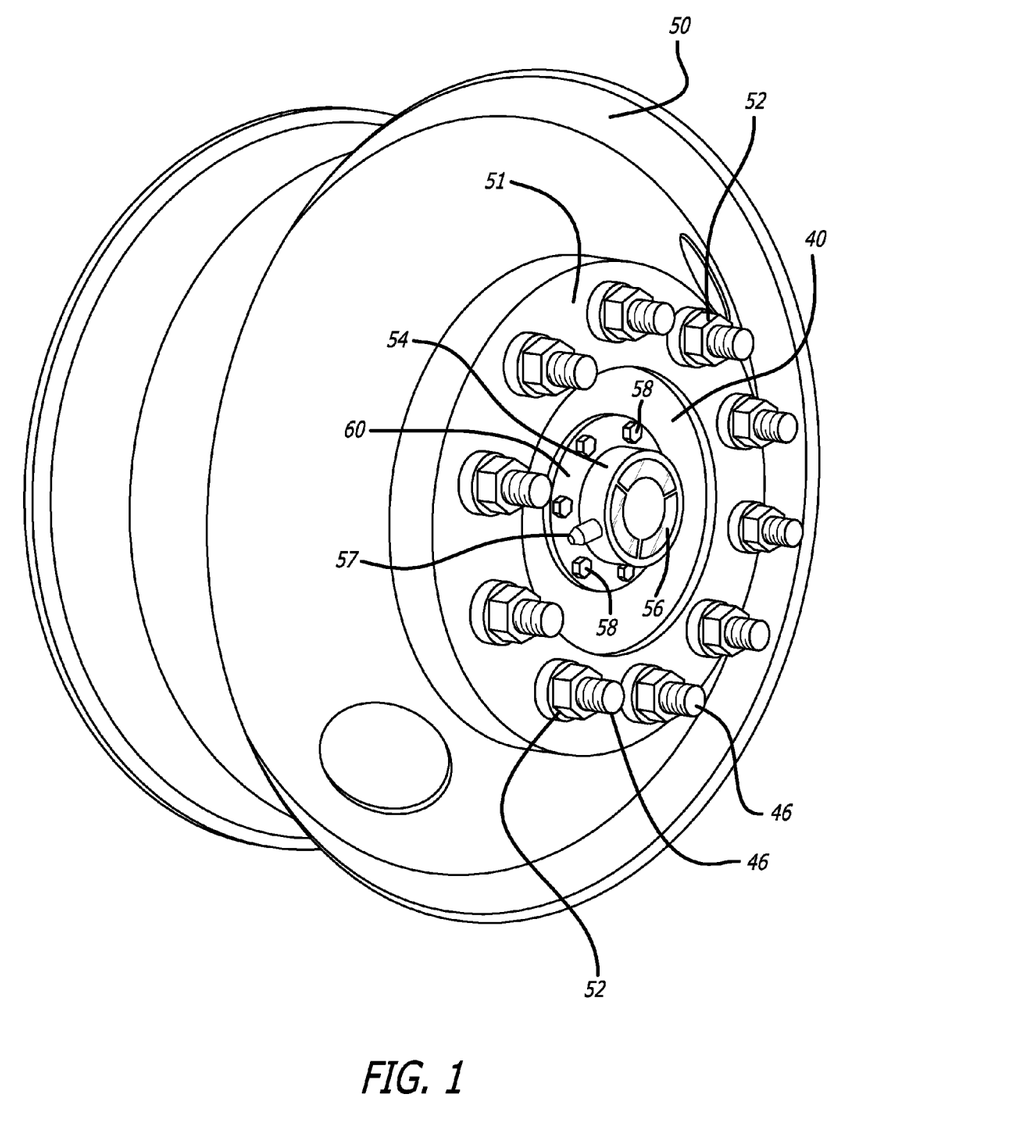
FIG. 1 is a perspective view of a typical wheel attached to an hub of a truck.
Figure 4:
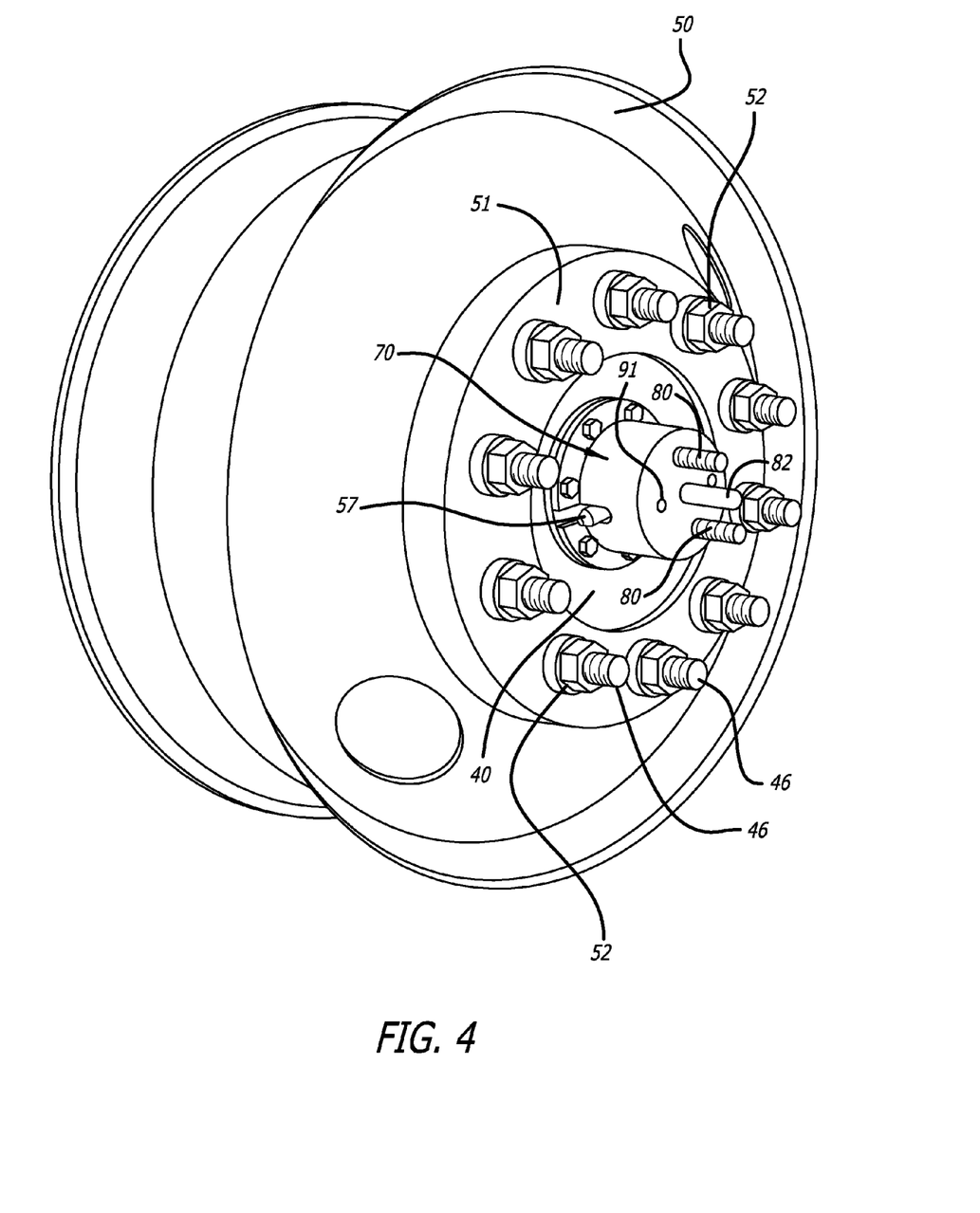
FIG. 4 is the wheel of FIG. 1, including the mounting member of FIGS. 2 and 3.

Prior to turning to the structure for connecting the cover assembly to the vehicle wheel, there will be described with reference to FIGS. 1, 4, and 5 certain features commonly found on large trucks that may provide the foundation for a device and method of connection of the present wheel covering system. Typically, the front axle 40 of a truck is the steering axle, and its terminal end commonly includes a number of features. An outer cylinder 44 acts as a hub and includes a number of lug bolts 46 (FIGS. 1, 4, and 5) protruding outwardly to be inserted through receiving holes 48 in the wheel 50 and to be covered by hex-head nuts 52 that will be tightened to a specified torque for proper operation and safety of the wheel in motion.

For the steering axle, there are commonly found three types of axle caps, (1) oil, (2) grease, and (3) non-serviceable. One of such axle caps 54 (also referred to as hub caps) of a kind typically found on a steering axle is commonly attached to the proximal end of the outer cylinder 44. The outer cylinder and hub cap rotate with the axle 40. This oil or grease hub cap will typically have a transparent window 56 (FIG. 1) to enable a vehicle operator to inspect the oil or grease level, and an oil valve 57 for introducing oil into the oil hub cap. The axle cap 54 is fixed to the axle 40 by a plurality of hub cap bolts 58 inserted through an external flange 60 on the hub cap, and into threaded hub cap holes 62 in the axle.

Turning now to a mounting member and mechanism configured to match and attach the cover assembly in the present invention, it has been determined that affixing the mounting member directly from the exterior of the axle cap 54 rather than from the lugs 46 of the outer cylinder 44 may be effectively achieved, as will be described, to produce a robust and effective connection coverable of safely holding a heavy cover assembly of about 40 pounds under acceleration, deceleration, and impact loads, and that overcome shortcomings in the art.

Figure 2:
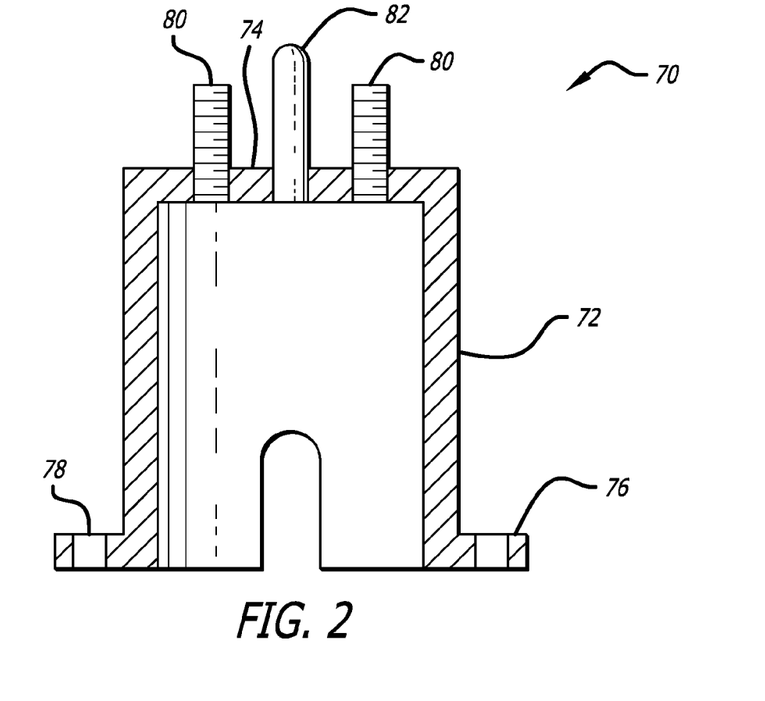
FIG. 2 is a vertical sectional view of a mounting member used in the present invention.
Figure 3:
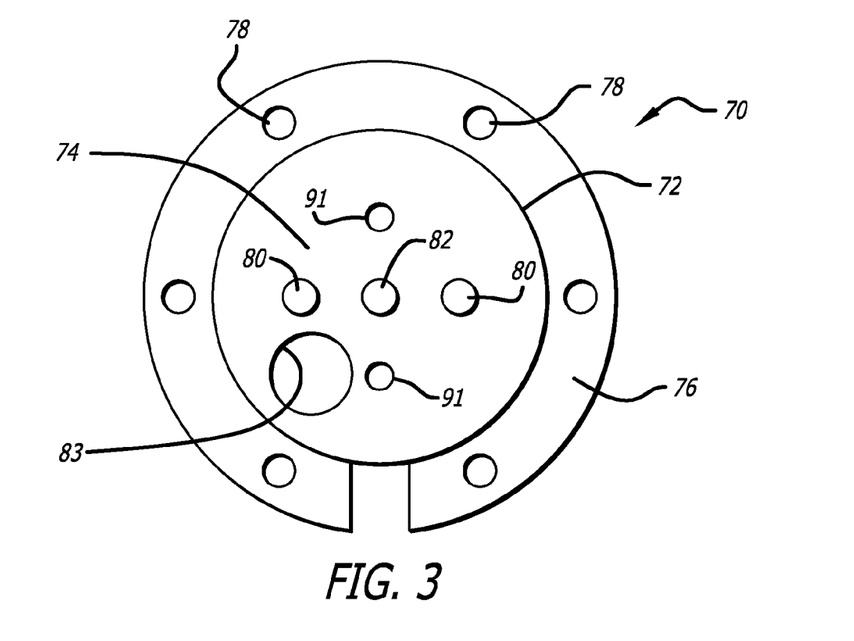
FIG. 3 is a plan view of the mounting member of FIG. 2.

In a preferred embodiment, and as best seen in FIGS. 2 and 3, a mounting member 70 or connector is provided for operation as a structural connection between the hub 44 and the cover assembly 20, 24 for operation of the wheel covering assembly of the present invention. The mounting member 70 includes a cylindrical portion 72 that, in a preferred embodiment, is fabricated to include a spun or cast steel cylinder which, in a preferred embodiment is 3-4 mm thick. A capping portion 74 takes the form of a flat steel disc that may be welded to the proximal edge of the cylindrical portion 72. An external flange 76 is made as a flat steel annulus that may be welded to the distal edge of the cylindrical portion 72. Holes 78 are drilled into the flange 76 to correspond with the locations of the bolts 58 holding the hub cap 54 to the axle 40. When the mounting member 70 is attached to a steering hub according to the present invention, the bolts 58 are removed from the hub cap 54, the mounting member 70 is positioned to straddle the hub cap 54, and the bolts 58 are replaced to attach both the hub cap 54 and the mounting member 70 to the hub 44, as exemplified in FIG. 5, thus capturing the mounting member 70 on top of the hub cap 54. (If required, a new set of bolts slightly longer than those removed from the hub cap may be used.) A slot 77 may be machined in the mounting member 70 to penetrate both the flange 76 and the cylindrical portion 72, as best seen in FIGS. 2 and 3, the slot being sized to receive the oil hub cap valve 57 which, when the mounting member is attached, may protrude outwardly from under the mounting member 70 so as to remain available to receive oil for refilling the oil cap.

On the covering portion 74 of the mounting member, two threaded lugs 80 are fixed to receive corresponding holes 100 (best seen in FIG. 5A) in the cover 20. The two threaded lugs 80 are preferably spaced equidistant from the center of the covering portion 74, diametrically opposite one another. Moreover, on the center of the covering portion 74 a threadless guide spindle 82 may be fixed, preferably having a length that is about half an inch longer than the flanking threaded lugs 80 and having a diameter that is about the same as the lugs, preferably 10-14 mm. The cover 20 has three mating holes 100 to receive the spindle first, and then the flanking lugs. Covering nuts 86 are screwed down onto the lugs 80 to secure the cover assembly onto the mounting member 70. Preferably, the covering nuts 86 are configured to have a unique circumferential profile so that the manufacturer may provide a mating socket for use by a vehicle owner. Such unique profile and mating socket, in effect, provides a key to the owner, making it extremely difficult for miscreants to remove the cover assembly without permission. A closing cap 88 may be inserted into a recess 90 in the cover 20 to protect and conceal the spindle, lugs, the covering nuts, and related assembly. The closing cap 88 may be held in the recess 90 by two bolts 89 configured to pass through the cover 20 and mate with two threaded holes 91 (FIG. 2) in the covering portion 74 for securing the closing cap 88 flush with the external surface of the cover 20. In a preferred embodiment, the floor 93 of the recess 90 is flat, thus allowing a stable and wobble free connection to be formed between the cover 20 and the mounting member 70 when the covering nuts are tightened to compress the floor against the mounting member.

Thus, under a preferred embodiment, the mounting member 70 includes two threaded lugs 80 and an additional spindle 82 for attaching the cover assembly to the hub. In light of the considerable weight of the cover assembly, two lugs and corresponding nuts provide a degree of redundancy and safety in case one of the nuts should come loose. Furthermore, by providing two lugs offset from the center, the capacity to withstand the rotational momentum applied by the cover assembly is greatly increased. It will be appreciated that the weight of the cover assembly, perhaps in the vicinity of 40 pounds, is much greater than in the case of a regular passenger automobile, and thus unbalanced angular momentum of the cover assembly caused by sudden braking may be substantial. The provision of a redundant second lug and nut combination, offset from the center of the cover, is advantageous in dealing with such momentum.

Moreover, in addition to the rotational forces exerted by the cover assembly, an additional force may be exerted as a shear force when the cover 20 is subject to an impact such as may be applied when hitting a curb, bollard, or other object, a not uncommon experience in the lifetime of a wheel cover. The ability of the wheel covering system to withstand these forces is greatly enhanced by the addition of the central spindle 82, so that three separate protrusions (the two lugs 80 and the spindle 82) are provided to withstand shear forces caused by impact.

An additional advantage provided by the central spindle 82 in combination with two lugs 80 is firstly that the spindle provides a guide pin to facilitate installing the cover assembly. A feature of the cover 20 provided to facilitate installation on the hub is that the central hole 100 on the cover 20 may be configured to terminate, on the inside face, in a conical taper 101 (FIG. 5A). Thus, because the spindle 82 is about half an inch longer than the flanking lugs 80, the installer is able to locate the central spindle 82 in the central hole 100 by sliding the cover past the spindle. When the spindle falls into the cone 101, the installer knows that he has found the correct hole, and pushes the cover assembly inwards so that its significant weight is taken by the spindle 82. Then, by rotating the cover assembly somewhat, the installer may easily align the lugs 80 with their corresponding holes 100, and push the cover assembly onto the lugs 80 before installing and tightening the covering nuts 86. The longer spindle feature eliminates the difficulty of having to simultaneously manually support the full weight of the cover assembly and find the correct cover alignment with respect to the two lugs 80 before the cover assembly may be pressed over the lugs.

In a further aspect, the mounting member 70 may include an aperture 83 cut into the proximal end of the mounting member (seen in FIG. 3), to enable the vehicle operator to view the oil or grease level in the hub via the window 56 in the oil or grease hub cap 54. The aperture 83 must be at the topmost point of its rotational travel for the vehicle operator to correctly assess the adequacy of the grease level. Thus, if the aperture is not at the topmost point of its travel when the vehicle is at rest, it may be necessary to roll the vehicle forward somewhat to bring the aperture 83 up to the topmost point of its travel before an inspection can be conducted.

It will be appreciated that the structure described has the further advantage of allowing a vehicle operator to remove a wheel by removing only the cover assembly. The mounting attachment 70 may remain in place on the hub while the wheel is removed, thereby avoiding the inconvenience of having to remove structure in addition to the wheel when changing or repairing a wheel.

Turning now to another embodiment of the present invention there is now described with reference to FIGS. 6-10 a wheel covering system having alternative features of the present invention. It is a common aspect of large trucks or rigs that they may have three (or more) sets of axles. The front axle is generally the steering axle, commonly having features such as those described above. Behind the front axle is a typically a drive axle, followed by a trailing axle. One variation between a steering axle and a drive axle is that a drive axle may have two wheels on each side, in which the geometry of the outer driving wheel differs from the geometry of the single steering wheel. Whereas a steering wheel is commonly configured to present a radially inner disc portion 51 generally flush with the outside profile of the wheel 50, as exemplified in FIGS. 1, 4, 5, an outer driving wheel is commonly configured to present a radially inner disc portion 51' generally flush with the inside profile of the wheel 50' as exemplified in FIGS. 6, 9, 10. Additionally, the outer drive axle commonly does not have a large oil or grease inspection cover (as a steering wheel may have), but rather may have a flat or bulbous plate sealing the hub, as exemplified in FIG. 6. In light of these variations of the geometry of the various hub to wheel configurations typical in a large vehicle, a further embodiment of the present invention is described.

Turning to FIGS. 6-10, there is described an alternative attachment system for attaching an ornamental wheel cover to a drive axle of a large truck. Where numerals are shown to be "primed," they refer to the same element as in the former embodiment, with any modifications made to suit the present embodiment. As in the case of the embodiment of the steering wheel covering system exemplified in FIGS. 1-5, the drive wheel covering system of the present embodiment includes an ornamental cover 20' which may similarly have openings (not shown in the figures), a foil 24' shaped to fill in a larger void in the wheel distal to the cover 20' and having a reflective surface facing the exterior of the cover to create visible depth in the cover. As in the former embodiment, the foil may be screwed onto the cover by screws 29' tapping into the cover 20' along two circumferential lines 26', 28' (outer and inner), thus forming a single cover assembly that can be readily manipulated into place over the wheel, stored, and transported.

Figure 7:
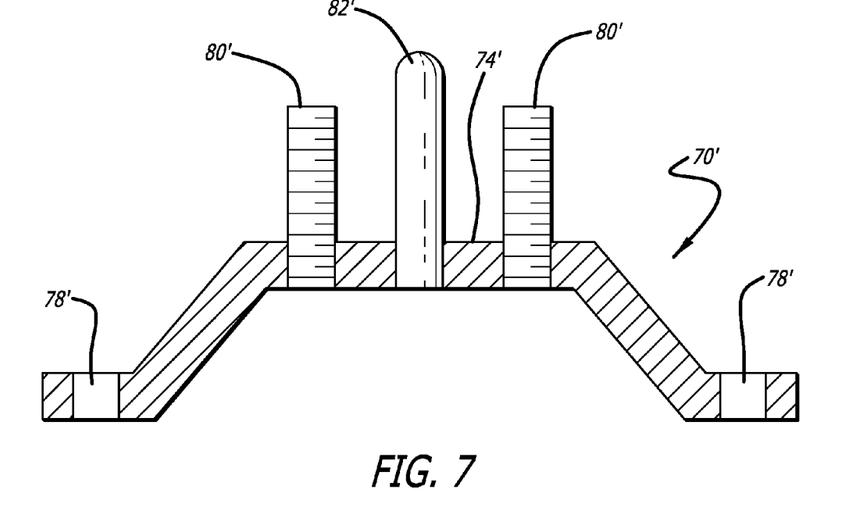
FIG. 7 is a vertical sectional view of an embodiment of a mounting member suitable for use with the wheel and hub of FIG. 6.
Figure 8:
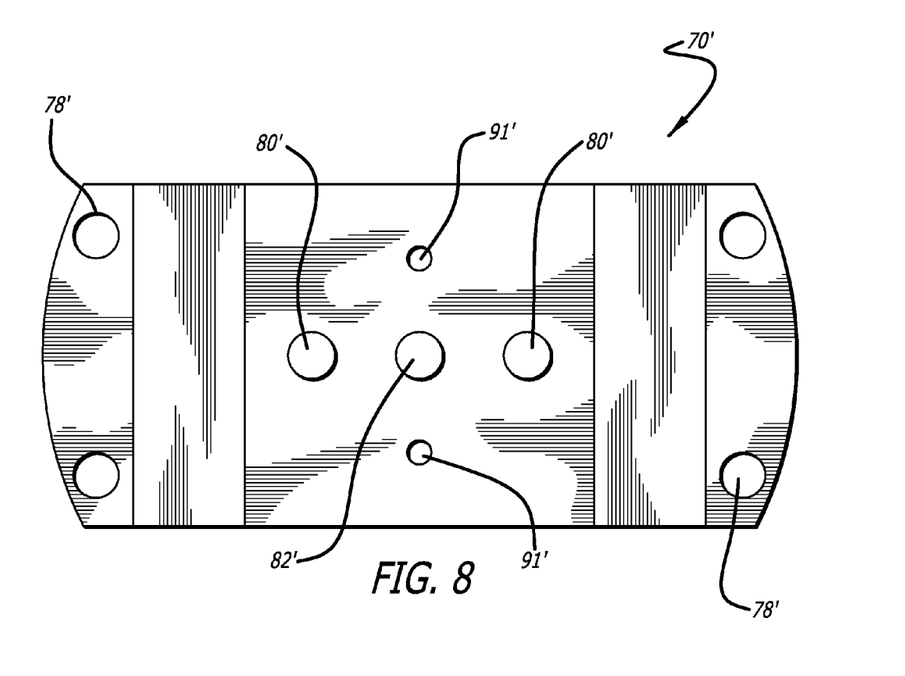
FIG. 8 is a plan view of the mounting member of FIG. 7.
Figure 9:
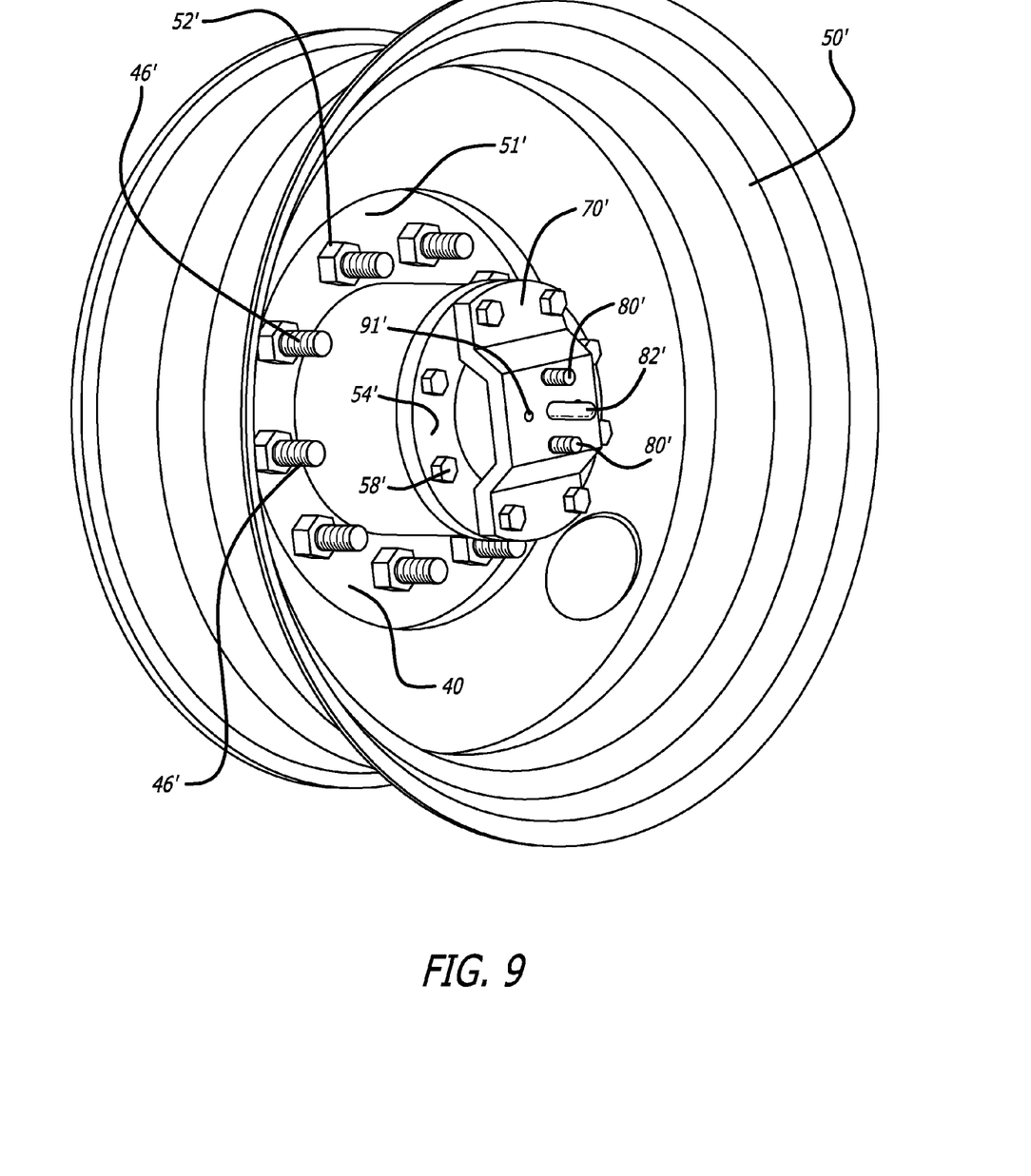
FIG. 9 is the wheel of FIG. 6, including the mounting member of FIGS. 7 and 8.
Figure 10:
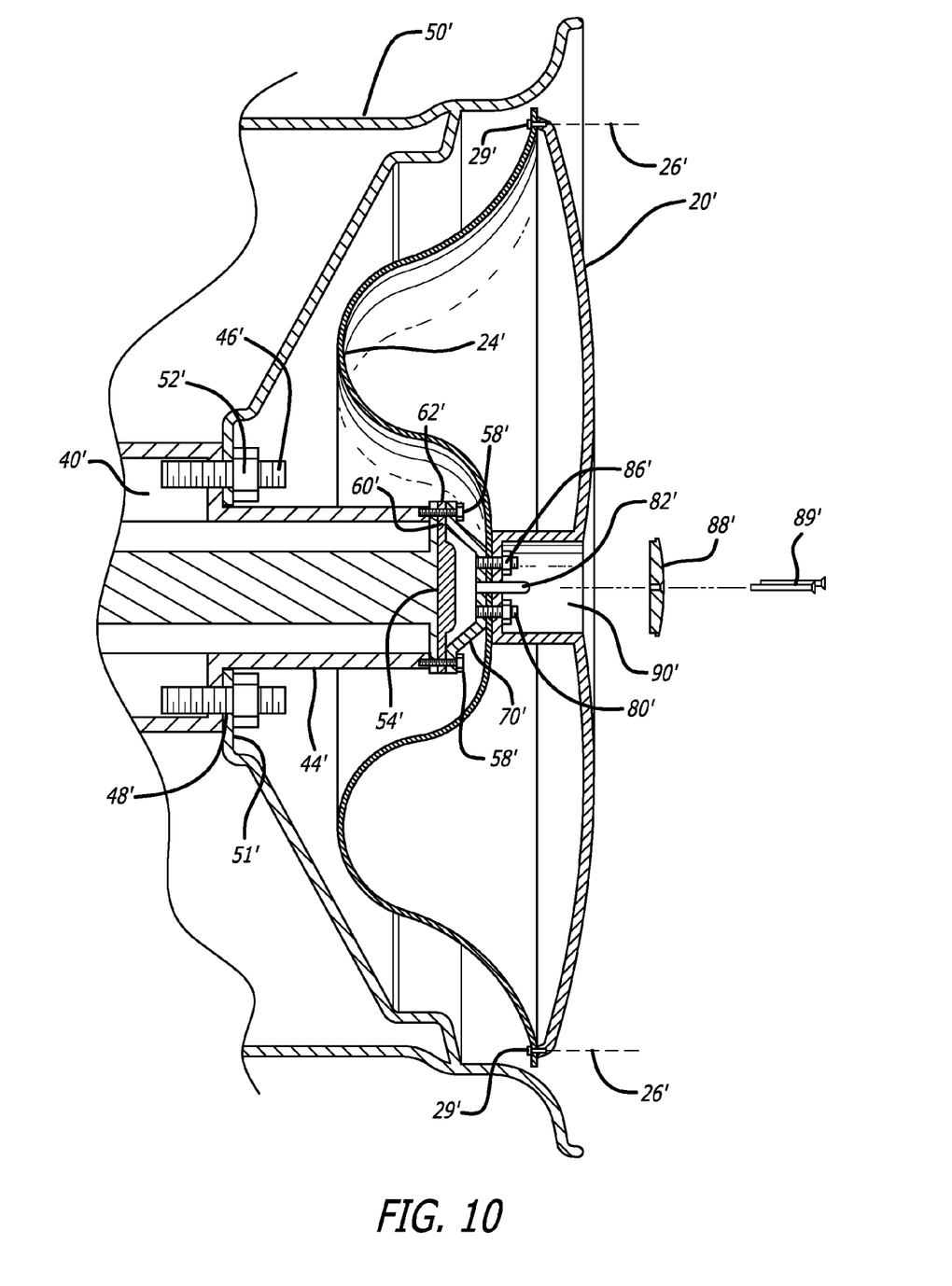
FIG. 10 is a vertical sectional view of the wheel in FIG. 9, including a wheel covering system attached.
Figure 10A:
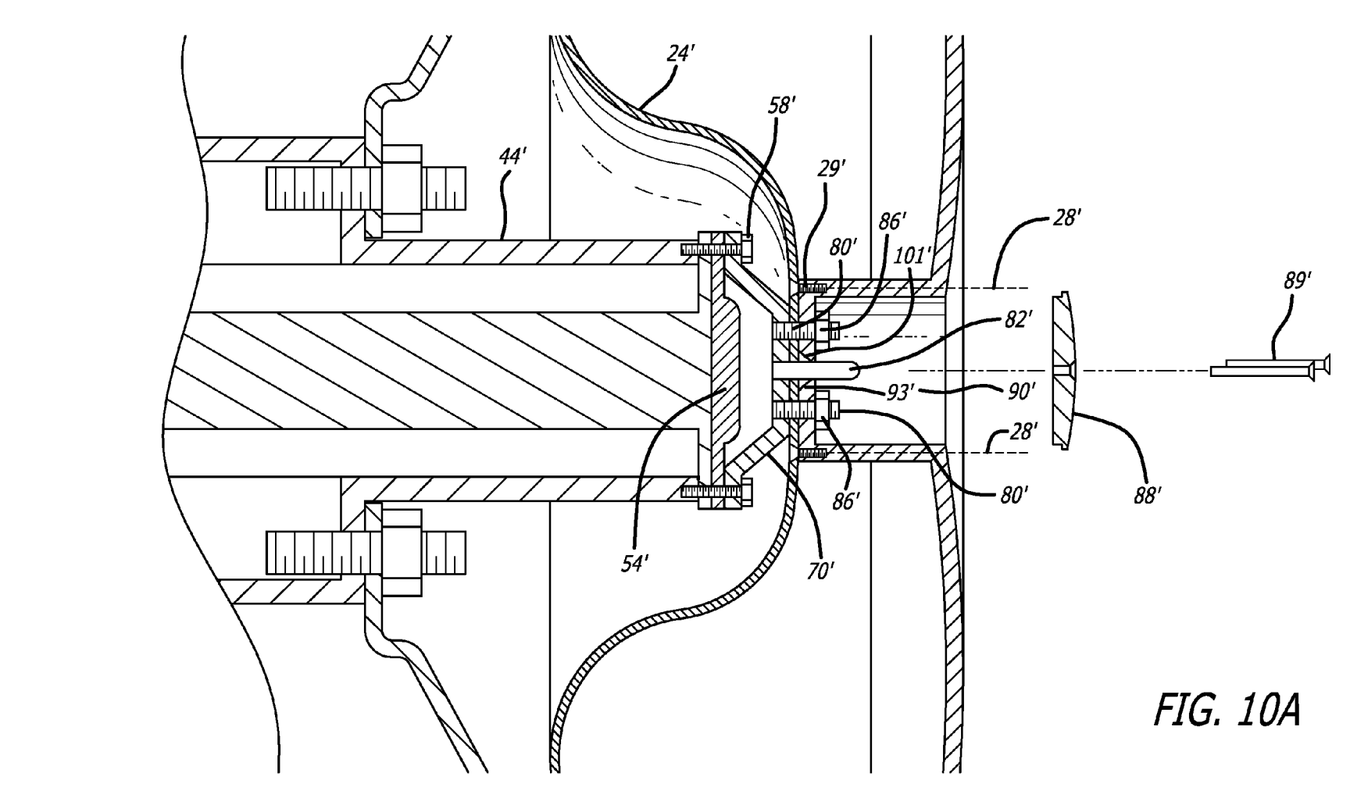
FIG. 10A is an expanded view of the central portion of FIG. 10.
Figure 10B:
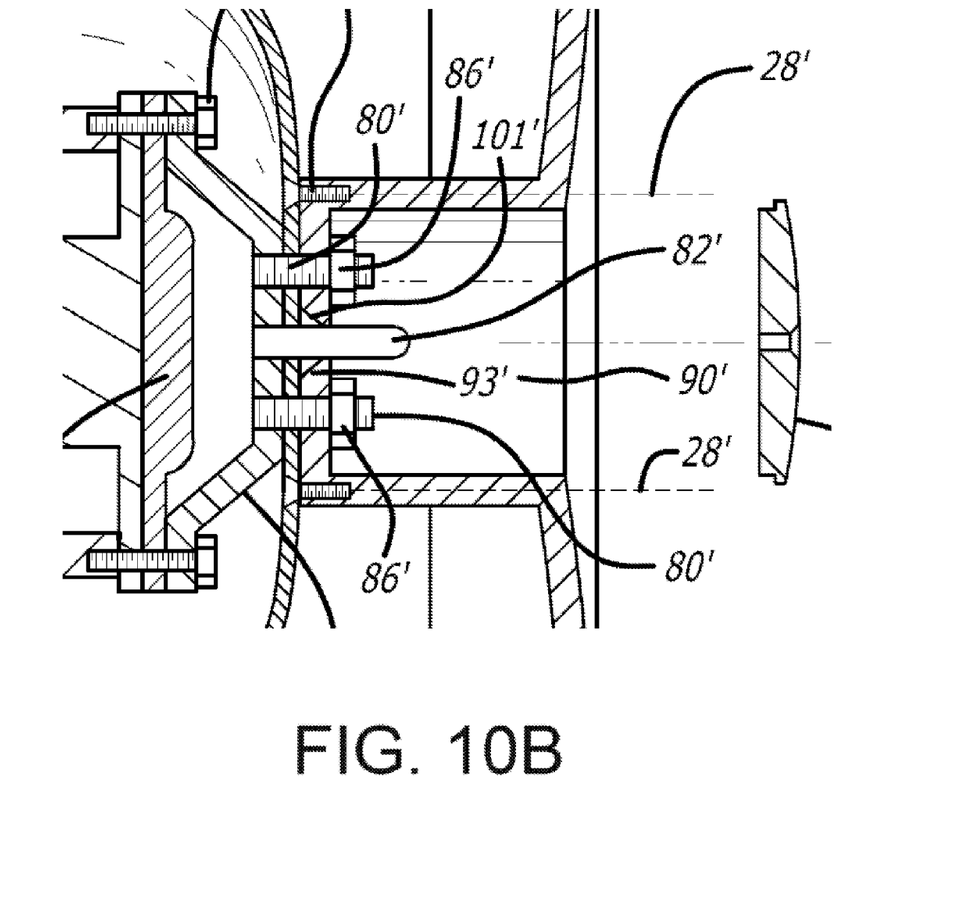
FIG. 10B is an expanded view of the central portion of FIG. 10A.

The mounting member 70' in this second embodiment is exemplified best in FIGS. 7-8. The mounting member is not formed from a cylinder as in the previous embodiment, but in this case may be fabricated from a flat metal plate which is then bent to a shape suitable for spanning over a bulbous axle cap 54' covering the driving wheel hub 44', as exemplified in FIGS. 7-8, and 10. Preferably, as in the previous embodiment, the proximal surface 74' of the mounting member is flat, and vertical, when in use. In a preferred embodiment, the thickness of the flat metal plate is between 5 and 6 mm, to provide suitable stiffness and strength without excessive weight. The extremities of the plate may be shaped to conform to the circular perimeter of the hub 44'. Holes 78' are provided in the extremities of the plate and positioned to match locations of the axle cover bolts 58' holding down the bulbous axle cap 54' on the hub. The mounting member 70' of this embodiment similarly includes two threaded lugs 80' positioned at a proximal end, offset from the center of the mounting member, and a threadless spindle 82' at the center, as in the previous embodiment, for installation of the cover assembly of the present embodiment in a similar way. It has been found that the bent plate mounting member 70' embodiment, although not as stiff as the cylindrical mounting member 70 of the previous embodiment, provides an inexpensive yet adequate and robust solution to connecting an ornamental wheel cover over a drive wheel of a truck and overcomes shortcomings in the prior art without adding excessive weight. As in the previous embodiment, the cover assembly includes a closing cap 88', held in position by two threaded bolts 89' configured to pass through the cover 20' and mate with two threaded holes 91' in the mounting member 70'. FIG. 10. Finally, as in the previous embodiment, the floor 93' of the recess is flat, to permit the cover 20' to form a stable and wobble free connection to the mounting member 70' when the covering nuts 86' are tightened.

Thus, when the wheel covering system of the present embodiment is to be installed, the installer removes the corresponding bolts 58' from the hub 44', places the mounting member 70' over the axle cap 54', and reinserts the bolts 58' in the same threaded holes from which they have been removed, thereby capturing the mounting member 70' on top of the axle cap 54'. (If required, longer bolts may replace the original bolts.) The mounting member 70' presents a suitable connection so that the covering system is mounted over the wheel on a part of the vehicle hub that is independent of the wheel attachment system. The mounting member 70' has adequate stiffness and strength to resist the magnitude of loads that will be applied to the wheel cover during its lifetime, and overcomes shortcomings in the prior art. The mounting member and related cover assembly may be easily removed from the hub without having to jack up the wheel, and it is configured to resist unbalanced forces that may be caused by sudden stopping and impact loads.

Thus, it is seen that the covering system of the present invention provides novel and useful features for covering certain kinds of wheel hubs, and overcoming shortcomings in the prior art. The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

I claim:

1. A wheel covering system for attachment to a vehicle axle, in which the axle has a plurality of threaded lugs for attaching a wheel, and in which an hub cap is attached to the axle by a plurality of threaded bolts, the system comprising:
   an ornamental cover having a center point and configured to be positioned adjacent the wheel, the ornamental cover having two holes, each hole offset a given distance from the center point;
   a mounting member configured to be removably attached to two diametrically opposite sides of the hub cap without being in contact with the threaded lugs, the mounting member having a distal end and a proximal end, wherein the distal end defines a plurality of holes configured to receive at least some of the threaded bolts for attaching both the mounting member and the hub cap to the axle, and further wherein the proximal end includes two outwardly extending threaded studs for insertion into the two holes so as to removably attach the cover to the mounting member, each of the two holes being sized to receive one of the studs so that a nut threaded onto one of the studs will secure the to the mounting member by compressing the cover against the mounting member; and
   wherein the cover has a third hole at the center point, and the proximal end of the mounting member includes a spindle positioned to be inserted through the third hole, the spindle being longer than the two threaded studs by about half an inch.

2. The wheel covering system of claim 1, wherein the third hole includes a conically shaped distal portion to facilitate insertion of the spindle in the third hole.

3. The wheel covering system of claim 1 wherein the cover has a recess for housing the studs.

4. The wheel covering system of claim 3, including a closing cap, for closing off the recess.

5. The wheel covering system of claim 4, wherein the closing cap is configured to be held in position by at least one bolt that is inserted into a threaded hole in the mounting member.

6. The wheel covering system of claim 3, wherein the recess has a floor that is flat, and the proximal end of the mounting member is flat, and wherein the floor of the recess is configured to be compressed against the proximal end of the mounting member by nuts screwed onto the threaded studs.

7. The wheel covering system of claim 1, wherein the mounting member includes a cylindrical portion, an external flange attached to the distal end, and a circular plate attached to the proximal end.

8. The wheel covering system of claim 7, wherein the cylindrical portion is between 3 mm and 4 mm thick.

9. The wheel covering system of claim 7, wherein the plurality of holes are formed in the flange.

10. The wheel covering system of claim 7, wherein the threaded studs are attached to the circular plate.

11. The wheel covering system of claim 1, wherein the mounting member includes a slot configured to receive a valve of the hub cap.

12. The wheel covering system of claim 1, wherein the mounting member includes an aperture positioned to allow inspection of the oil or grease level in the hub cap.

13. The wheel covering system of claim 1, wherein the mounting member is formed from an initially flat plate having two ends, the plate being bent to a configuration adapted to span across the hub cap and to be fixed to the hub cap by the two ends.

14. The wheel covering system of claim 13, wherein the thickness of the plate is between 5 mm and 6 mm.

15. A wheel covering system for attachment to a vehicle axle, in which the axle has a plurality of threaded lugs for attaching a wheel, and in which a hub cap is attached to the axle by a plurality of threaded bolts, the system comprising:
   a first cover element having a center point and configured to be positioned adjacent the wheel, the first cover element having two holes, each hole offset an equal distance from the center point;
   a second cover element attached to the first cover element along a first, outer circumferential line by a plurality of screws; and
   a mounting member configured to be removably attached to two diametrically opposite sides of the hub cap without being in contact with the threaded lugs, the mounting member having a distal end and a proximal end, wherein the distal end defines a plurality of holes configured to receive at least some of the threaded bolts for attaching both the mounting member and the hub cap to the axle, and further wherein the proximal end includes two outwardly extending threaded studs for insertion into the two holes so as to removably attach the first cover element to the mounting member, each of the two holes being sized to receive one of the studs so that a nut threaded onto one of the studs will secure the first cover element; and
   wherein the cover has a third hole at the center point, and the proximal end of the mounting member includes a spindle positioned to be inserted through the third hole, the spindle being longer than the two threaded studs by about half an inch.

16. The wheel covering system of claim 15, wherein the third hole includes a conically shaped distal portion to facilitate insertion of the spindle in the third hole.

17. The wheel covering system of claim 15, wherein the second cover element is attached to the first element along a second, inner circumferential line by a plurality of screws.

18. The wheel covering system of claim 15, wherein the second cover element includes a proximal surface treated to provide a polished surface for reflecting light.

19. The wheel covering system of claim 15, wherein the first cover element has a recess for housing the studs.

20. The wheel covering system of claim 19, wherein the first cover element further includes a closing cap, for closing the recess.

21. The wheel covering system of claim 20, wherein the closing cap is configured to be held in position by at least one bolt that is inserted into a threaded hole in the mounting member.

22. The wheel covering system of claim 19, wherein the recess has a floor that is flat, and the proximal end of the mounting member is flat, and wherein the floor of the recess is configured to be compressed against the proximal end of the mounting member by nuts screwed onto the threaded studs.

23. The wheel covering system of claim 15, wherein the mounting member includes a cylindrical portion, an external flange attached to the distal end, and a circular plate attached to the proximal end.

24. The wheel covering system of claim 23, wherein the cylindrical portion is between 3 mm and 4 mm thick.

25. The wheel covering system of claim 23, wherein the plurality of holes are formed in the flange.

26. The wheel covering system of claim 23, wherein the threaded studs are attached to the circular plate.

27. The wheel covering system of claim 15, wherein the mounting member includes a slot configured to receive a valve on the hub cap.

28. The wheel covering system of claim 15, wherein the mounting member includes an aperture positioned to allow inspection of the oil or grease level in the hub cap.

29. The wheel covering system of claim 15, wherein the mounting member is formed from an initially flat plate, which is bent to a configuration adapted to be attached to two opposite sides of the axle cap.

30. The wheel covering system of claim 29, wherein the thickness of the plate is between 8 mm and 9 mm.

\* \* \* \* \*

UNITED STATES PATENT AND TRADEMARK OFFICE
CERTIFICATE OF CORRECTION

PATENT NO. : 7,547,076 B2
APPLICATION NO. : 11/626554
DATED : June 16, 2009
INVENTOR(S) : Ronald Necaise

It is certified that error appears in the above-identified patent and that said Letters Patent is hereby corrected as shown below:

Column 9, line 33, after "secure the" insert --cover--.

Column 10, line 38, after "element" insert --to the mounting member by compressing the first cover element against the mounting member--.

Signed and Sealed this

Twenty-second Day of December, 2009

David J. Kappos
*Director of the United States Patent and Trademark Office*